Feb. 28, 1967    W. R. CROOKS    3,306,042
FLUID TRANSMISSION FOR DRIVE AND DRIVEN MEMBERS
Filed Nov. 21, 1963    4 Sheets-Sheet 1
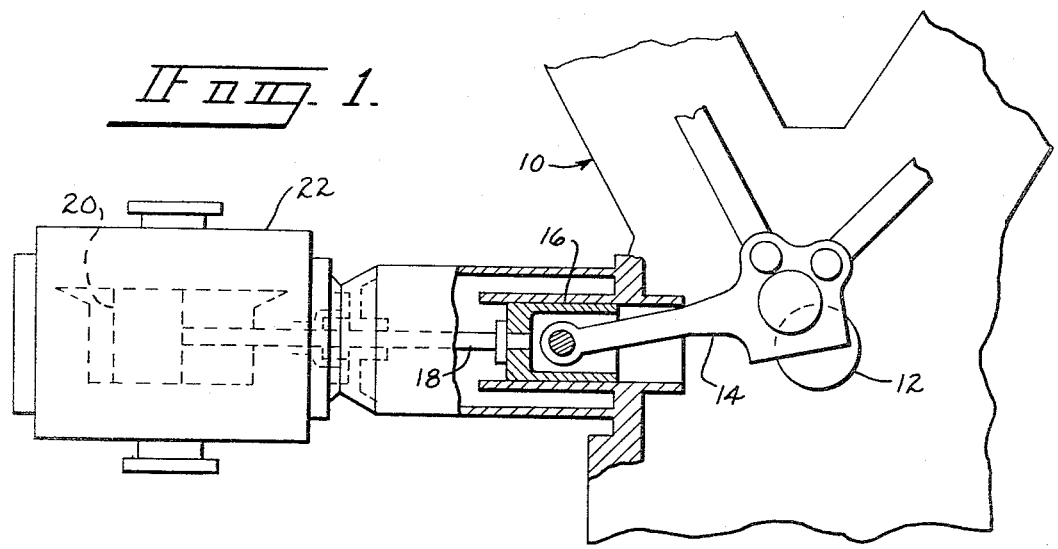
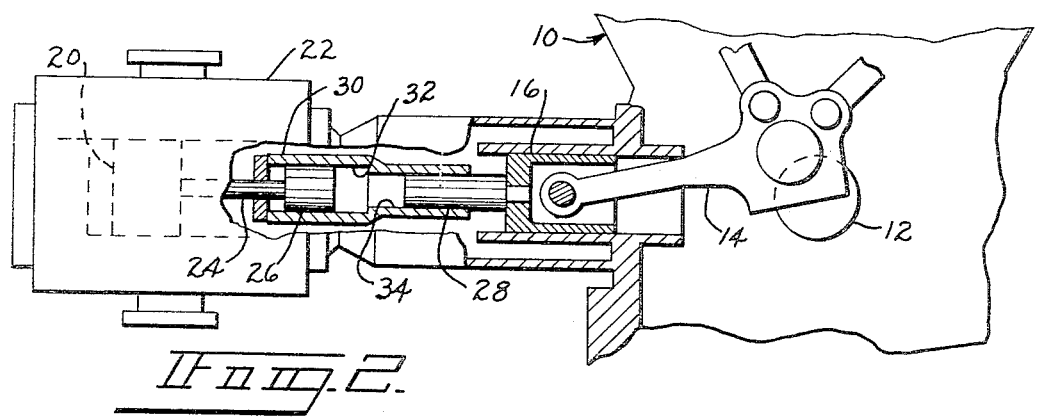
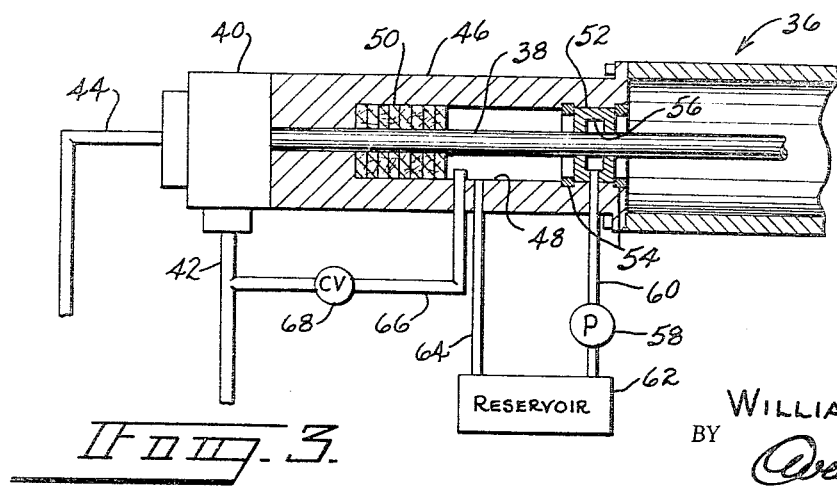
INVENTOR.
WILLIAM R. CROOKS
BY
Owen & Owen
ATTORNEYS Feb. 28, 1967 W. R. CROOKS 3,306,042
FLUID TRANSMISSION FOR DRIVE AND DRIVEN MEMBERS
Filed Nov. 21, 1963 4 Sheets-Sheet 2
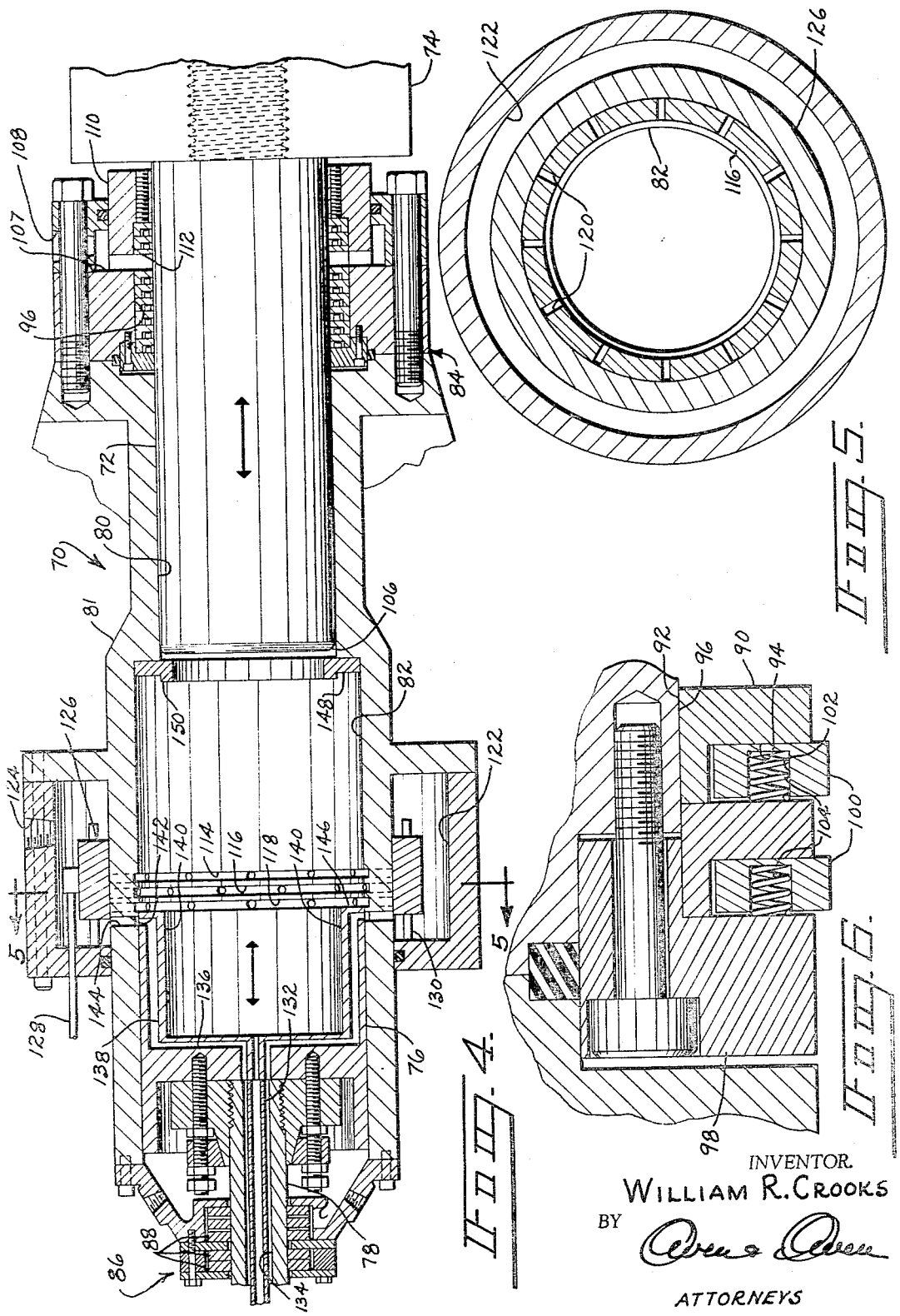
INVENTOR.
WILLIAM R. CROOKS
BY
ATTORNEYS

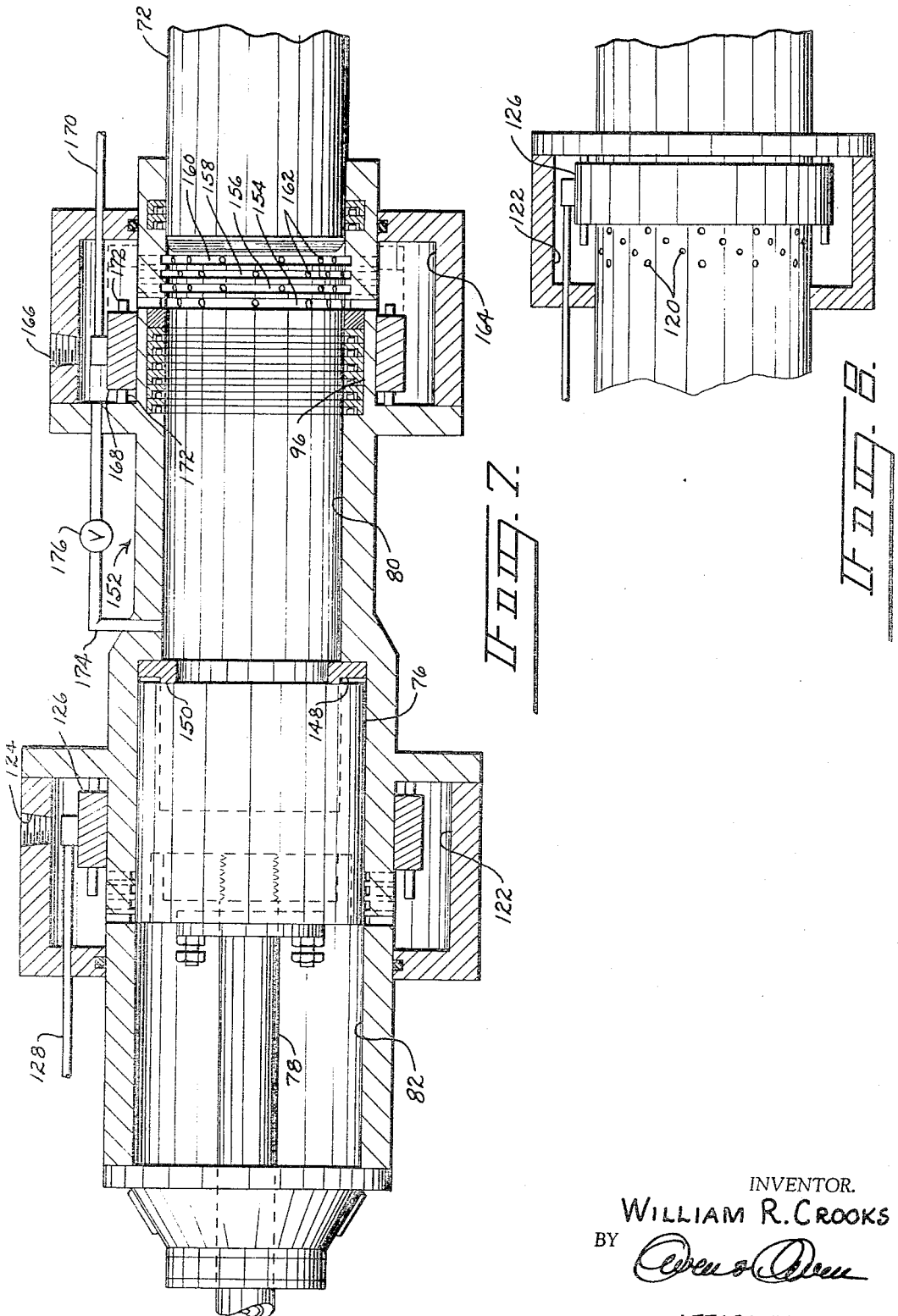

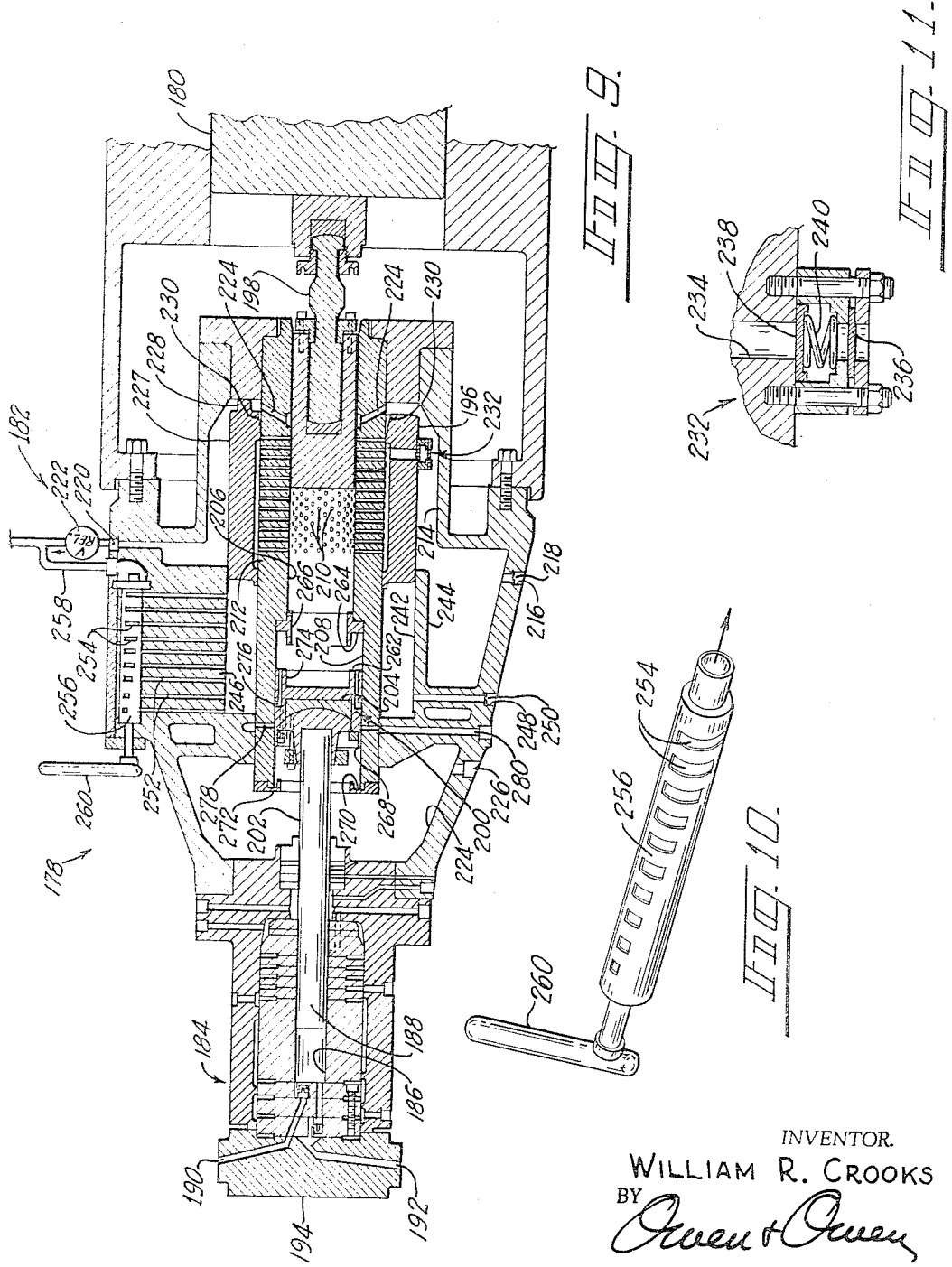

3,306,042
FLUID TRANSMISSION FOR DRIVE
AND DRIVEN MEMBERS
William R. Crooks, Mount Vernon, Ohio, assignor to
The Cooper-Bessemer Corporation, Mount Vernon,
Ohio, a corporation of Ohio
Filed Nov. 21, 1963, Ser. No. 326,326
8 Claims. (Cl. 60—54.5)

This is a continuation-in-part of an application Serial No. 227,504, filed October 1, 1962, and now abandoned.

This invention relates to a fluid mechanism interposed in the drive between a prime mover and a driven member and more particularly to a fluid transmission located between a reciprocating drive member and a reciprocable driven member, which transmission is capable of modifying the characteristic motion of the driven member independently of the motion of the drive member.

Heretofore, a reciprocable drive member of a prime mover usually has been connected directly to a driven, reciprocable member so that the movement of the drive member is reproduced exactly in the driven member. For example, a crosshead operated by a connecting rod of a crankshaft has been connected directly to a piston of a compressor through a piston rod. The drive and driven members, in this instance the crosshead and the compressor piston, having been directly connected, assume identical motions, including strokes per unit of time, lengths of strokes, and lineal speeds. In addition, a change in the rotational speed of the crankshaft changes the lineal speed of the piston, the number of strokes per unit of time, and the amount of power delivered.

There are many instances in which it is desired to operate a driven member, such as the compressor piston, with a motion differing from that of a driving member, such as the crosshead, the difference being in the lengths of the strokes or the lineal speeds, for example. It also sometimes is desirable to obtain a greater compressor output pressure for a particular size of prime mover without increasing the loading on the crankshaft of the prime mover.

The advantage of having different motions can be illustrated further by a particular example. Large capacity compressors, ranging from about 35,000 p.s.i. to 100,000 p.s.i., are often driven by relatively high cost engines which are better adapted to produce variable outputs of the compressed gas than are some lower cost, constant speed prime movers. However, by employing a fluid transmission or connection between drive and driven members in accordance with the invention, the output of the compressor can be easily varied by changing the length of stroke of the compressor piston, without changing the stroke of the drive member or the rotational speed of the crankshaft at all. Hence, by employing a fluid transmission according to the invention, a lower cost, constant speed prime mover can be used.

In addition, the velocity of the gas when entering or emerging from the compressor is preferably kept below a given design value because efficiency of the compressor decreases substantially if the gas passes through the valves at higher than the design velocity. To obtain low gas velocity, the compressor piston also must move at low velocity. On the other hand, it is usually desired to operate the prime mover at relatively high rates of speed to achieve a higher power output from a relatively small power unit and to obtain improved fuel economy and higher efficiency. For example, by increasing the speed of a given prime mover from 250 r.p.m. to 310 r.p.m., the output can be increased from 350 to 435 horsepower per cylinder. By employing a fluid transmission according to the invention, the prime mover can be operated at high lineal speed and the compressor piston at low lineal speed. For example, a 20-inch stroke of the drive member or crosshead can be changed to a 16-inch stroke of the compressor piston and the rotational speed of the crank can then be increased from 250 r.p.m. to 310 r.p.m. to obtain the increase in horsepower without changing the lineal speed of the piston. Further, this change permits increasing the loading on the compressor piston rod from 115,000 to 140,000 pounds without increasing the load on the prime mover crankshaft. The fluid transmission embodying the invention thereby can achieve a different length and lineal velocity of the stroke of the driven member and also can enable it to exert a variation in force.

The transmission is also equipped with a unique high pressure gas seal associated with the piston rod of the compressor, which seal keeps leakage normally a sizeable problem with high compression systems, at a minimum. Further, the fluid transmision has a novel arrangement for cooling the piston rod during operation by means of the fluid used in the transmission itself.

It is, therefore, a principal object of the invention to provide a fluid transmission between drive and driven members, which transmission enables the two members to operate with different motions.

Another object of the invention is to provide a fluid transmission between drive and driven members, which transmission enables the members to operate with different lengths of strokes and at different lineal velocities.

Still another object of the invention is to provide a fluid transmission between drive and driven members, which transmission has an improved fluid seal for the driven member.

A further object of the invention is to provide a fluid transmission between drive and driven members, which transmission has improved cooling means for a portion of the driven member.

Other objects and advantages of the invention will be apparent from the following detailed description of preferred embodiments thereof, reference being made to the accompanying drawing, in which:

FIG. 1 is a somewhat schematic view in elevation, with parts broken away and with remaining parts in cross section, of a prime mover and driven unit which are directly connected in the conventional manner;

FIG. 2 is a somewhat schematic view in elevation, with additional parts broken away and with remaining parts in cross section, of a prime mover and a driven unit having a fluid transmission or connection embodying the invention;

FIG. 3 is a somewhat schematic view, partly in cross section, of a high pressure sealing means which can be used with the fluid connection shown in FIG. 2;

FIG. 4 is a view in longitudinal cross section of a slightly modified fluid connection having means for selecting a predetermined length of stroke for the driven member;

FIG. 5 is a view in transverse cross section taken along the line 5—5 of FIG. 4;

FIG. 6 is a fragmentary view on an enlarged scale of a portion of the fluid connection shown in FIG. 4;

FIG. 7 is a view in longitudinal cross section similar to FIG. 4 of a further modified fluid connection embodying the invention, with means for applying force by the drive member at predetermined lineal positions;

FIG. 8 is a detailed view of a portion of FIG. 7 with parts thereof in elevation rather than in cross section;

FIG. 9 is a view in longitudinal cross section of a modified fluid connection;

FIG. 10 is an enlarged view in perspective of a control component of the fluid connection of FIG. 9; and FIG. 11 is a fragmentary sectional view of a safety seal of the connection of FIG. 9.

Referring to the drawings, and more particularly to FIG. 1, a conventional arrangement includes a prime mover indicated at 10 having a crankshaft 12 which operates a connecting rod 14 connected to a crosshead 16. The crosshead is directly connected by a piston rod 18 to a piston 20 in a compressor indicated at 22. The drive characteristics of the engine or prime mover 10 thereby are transmitted directly to the compressor piston 20, the members 14 and 18 traveling the same lineal distance, having the same number of strokes, moving at the same lineal speed, and exerting the same trust.

Referring now to FIG. 2, the same prime mover 10 and the same compressor 22 are shown along with the same compressor piston 20 and the same crosshead 16. In this instance, however, a shorter piston rod 24 is used in place of the piston rod 18 and this is connected to a transfer piston 26 rather than directly to the crosshead 16 while the crosshead 16 is connected to a transfer plunger 28. The transfer piston 26 and the transfer plunger 28 extend into a common transfer housing or casing 30 which forms a transfer piston cylinder 32 and a transfer plunger cylinder 34 which, in this instance, are of different diameters. The piston and plunger are spaced apart in the housing 30 with a transfer fluid chamber therebetween so that movement of the plunger 28 will cause movement of the piston 26.

With the diameter of the piston cylinder 32 being larger than that of the plunger cylinder 34, a given lineal movement of the plunger 28 will cause a lesser lineal movement of the piston 26 with a proportional decrease in the lineal speed of the piston 26 and a proportional increase in the force exerted by it. Thus, the compressor can be operated at a relatively low velocity to prevent a drop in efficiency due to an excessive rate of flow of the compressed gas past the valves or, for a given speed of the compressor piston 20, the prime mover 10 can be operated at a higher, more efficient speed. The output of the compressor also can be varied for a constant speed of the prime mover. Of course, it may be desirable to make the piston cylinder 32 of smaller diameter than the plunger cylinder 34 to obtain the opposite of the above-discussed result, for a particular application.

Referring to FIG. 3, a unique gas seal between a compressor and a fluid transmission or connection is shown in detail. In this instance, a fluid connection indicated at 36 can be similar to that of FIG. 2 and will not be discussed in detail. A piston rod 38 extends from the fluid connection 36 to a compressor 40 which, in this instance, is a final stage, high pressure compressor in which the piston is slightly, if any, larger than the piston rod 38. The compressor 40 also has suitable valves to regulate and direct the input of gas through a supply line 42 and the output of gas through an exhaust line 44. A high pressure gas trap or seal 46 is located between the fluid connection 36 and the compressor 40 to minimize the escape of gas from the compressor 40 and to minimize the contact of the gas with hydraulic fluid or oil of the fluid connection. The trap 46 includes a chamber 48 with a plurality of sealing rings 50 located at the end closer to the compressor 40, with the rings 50 minimizing the escape of gas from the compressor 40 into the chamber 48. Gas which does reach the chamber 48 is prevented from travelling beyond it to the fluid connection 36 by means of a hydraulic fluid boot 52 which is positioned around the piston rod 38 near the opposite end of the chamber 48 by means of rings 54. The boot 52 defines an annular space 56 around the piston rod 38, which space is filled with high pressure hydraulic fluid by means of a pump 58 in a supply line 60 which communicates with a reservoir 62. The pump 58 maintains the oil at high pressure in the annular space 56 and this pressure is in excess of that of any gas in the chamber 48. A drain line 64 returns to the reservoir 62 any oil leaking from the boot 52 into the chamber 48.

Because of the boot 52, with the oil pressure therein being higher than any gas pressure in the chamber 48, any gas leaking into the chamber 48 can go no farther and would ordinarily remain trapped there. This gas, however, is returned to the supply line 42 through an exhaust line 66 and a check valve 68 with the line 66 being subject to the suction of the compressor 40 during the return stroke of the piston therein. The line 66 projects above the bottom of the chamber 48 in order not to collect any oil in the chamber 48 leaking from the boot 52. The exhaust line 66 keeps the chamber 48 at relatively low pressure and the oil in the boot 52 is established at a somewhat higher pressure, in the order of 3 p.s.i. higher.

Referring now to FIG. 4, a modified fluid connection indicated at 70 has means for varying the motion of the driven member relative to that of the drive member beyond the difference resulting from the different diameters of the piston and plunger. While the stroke and speed of the driven member are less than that of the drive member with the fluid connection 30 of FIG. 2, the extent of this difference cannot be changed. In some applications, however, it is advantageous to vary the motion of the driven member; for example, in a compressor, it is sometimes desirable to vary the capacity or output without changing the speed of the prime mover. The fluid connection of FIG. 4 accomplishes this variation.

The fluid connection 70 is basically similar to the connection 30 of FIG. 2, including a drive plunger 72 connected to a crosshead 74 and a driven piston 76 which is connected to a piston of a compressor (not shown) by means of a piston rod 78. The plunger 72 reciprocates in a plunger cylinder 80 of a casing 81, and the piston 76 reciprocates in a piston cylinder 82 which, in this instance, is of larger diameter than the cylinder 80, but can be of the same or smaller diameter.

A seal indicated at 84 surrounds the plunger 72 at the outer end of the plunger cylinder 80 while a seal indicated at 86 surrounds the piston rod 78 at the outer end of the piston cylinder 82. These seals prevent the leakage of high pressure hydraulic fluid or oil from the cylinders 80 and 82 between the plunger 72 and piston 76. The latter seal 86 is of the labyrinth type and includes a plurality of rings 88 which can be similar to the rings 50 of FIG. 3, or of the oil seal type shown at 52 in FIG. 3.

The plunger seal 84 (see FIG. 6 also) is somewhat more complicated and includes a plurality of ring holders 90 having annular lips 92 which contact the adjacent holding rings 90 and form annular recesses 94 therewith when the rings 90 are held together in a cylindrical recess 96 by means of a clamping ring 98. A bull ring 100 is located in each of the annular recesses 94 and is of lesser diameter and thinner than the recess so as to extend radially inwardly beyond the associated holding rings 90 and to be spaced from the outer periphery of the recess and one side thereof. Each of the bull rings 100 includes a plurality of circumferentially spaced recesses 102 for springs 104 which press the associated bull ring 100 against the side of the recess 94 and frictionally position it with respect to the holding rings 90. A substantial amount of heat is built-up by contact of the bull rings 100 with the plunger 72 and the particular positioning arrangement for the bull rings 100 enables them to expand both radially and axially in the recesses 94 without binding. Also, this expansion otherwise could move the rings 100 laterally with respect to the plunger 72, but the springs 104 enable the rings to adjust somewhat and remain concentric, this being aided by a beveled nose 106 on the plunger 72.

Additional hydraulic fluid or oil can be supplied to the cylinders 80 and 82 from an annular manifold 107 (FIG. 4) which receives oil from a suitable inlet opening 108 and supplies it through a spacer ring 110 having a plurality of apertures 112, the ring 110 being located between two of the holding rings 90. The sealing rings 100 to the right of the apertures 112 prevent hydraulic fluid from leaking out the end of the cylinder 80 at the withdrawn position of the plunger 72 while the rings 100 to the left of the spacer ring 110 prevent the high pressure hydraulic fluid from leaking out of the cylinder 80 during a power stroke of the plunger 72.

The length of stroke of the piston 76 can be controlled in this instance by three annular exhaust grooves 114, 116 and 118 (see FIG. 5 also) which are axially spaced from one another in the position cylinder 82 and have a plurality of radially extending exhaust ports 120, as shown in FIG. 5. The ports 120 communicate with an annular exhaust manifold 122 from which exhausted hydraulic fluid is expelled through an exhaust opening 124, communicating with an exhaust line (not shown). The exhaust ports 120 of the exhaust grooves 114, 116, 118 also can be covered by a control collar 126 which can be moved axially in the exhaust chamber 122 by a push-pull control rod 128 with the movement limited by a stop pin 130.

When the control collar 126 covers the ports 120 of all three of the grooves 114, 116, and 118, and when the plunger 72 moves into the plunger cylinder 80, the piston 76 tends to move out of or toward the left in the piston cylinder 82 and continues to do so until the plunger 72 reaches the end of its stroke. The length of the stroke of the piston 76 thereby is determined solely by the length of the stroke of the plunger 72 and the lineal velocity is inversely proportional to the ratio of the square of the diameters of the cylinders 80 and 82. If the collar 126 is then moved toward the right to uncover the ports 120 in the exhaust groove 118, the stroke of the piston 76 will change accordingly because the hydraulic fluid in the cylinders 80 and 82 will exhaust through the ports 120 in the groove 118 when they are exposed by the piston 76. The hydraulic fluid will then exhaust through the exhaust chamber 122 and the pressure of the hydraulic fluid in the cylinders 80 and 82 will decrease, the piston 76 thus stopping. Hydraulic fluid exhausted will then be replaced by additional fluid supplied through the ring 110 during the next stroke of the plunger 72. The replenishing of part of the hydraulic fluid also removes any form which otherwise tends to build up in the cylinders 80 and 82.

If it is desired to shorten the stroke of the piston 76 even more, so as to further decrease the output of the associated compressor, for example, the control collar 126 is moved to the right to expose ports 120 in the exhaust groove 116 with piston 76 then completing its stroke when it uncovers the ports 120 and the groove 116. Similarly, the collar 126 can be moved further to the right to enable the ports 120 in the groove 114 to communicate with the exhaust chamber 122, at which time the piston 76 completes a stroke when uncovering the ports of the groove 114. During this change in the length of the stroke of the piston 76, the stroke of the plunger 72 remains the same.

The piston rod 78 often tends to become quite hot due to friction of the sealing rings 88 of the seal 86 and also because of heat from the compressor. Cooling means can be provided to dissipate the excess heat and cool the rod 78 along with the piston of the compressor if desired. Accordingly, a concentric cooling tube 132 can be located in a passage 134 of the piston rod 78 with the tube 132 opening at the piston 76 toward the cylinder 82. The tube 132 terminates short of the other end of the passage 134 so that the fluid in the tube can return through the passage 134 which communicates with radial cooling passages 136 and axial cooling passages 138, which open through a wall 140 of the piston 76 to a cooling groove 142 which has a plurality of cooling ports 144 communicating with the exhaust chamber 122. A complete passage is established from the piston cylinder 82 through the tube 132, the passage 134, and the passages 136 and 138 to the groove 142, the ports 144, and the exhaust chamber 122 when the piston 76 has reached the end of its stroke. At that time, some of the hydraulic fluid under pressure in the cylinder 82 passes through the rod 78 to the exhaust chamber 122 and thereby carries with it heat from the rod 78 and also from the compressor piston. This movement of the hydraulic fluid also has the beneficial effect of purging some of the hydraulic fluid from the cylinders 80 and 82 and thereby removing foam, if such exists, even if the ports of the grooves 114, 116, and 118 are covered by the collar 126. Of course, if the ports of one or more of the grooves 114, 116, and 118 are open, some hydraulic fluid passes through the tube 132 and the passage 134 whenever the piston passes by the groove with the opened ports.

The hollow piston 76 forms an annular end 146 which cooperates with an annular recess 148 in a partitioning ring 150 between the cylinders 80 and 82 so that the end 146 and the recess 148 serve as a dashpot when the piston 76 reaches the end of its stroke and thereby cushions the piston at this point.

While the fluid connection 70 of FIG. 4 provides means for shortening the length of the stroke of the piston 76 and provides a dwell period, a fluid connection indicated at 152 in FIG. 7 provides additional means for affecting the length of the stroke of the piston and also for providing a dwell at the beginning or right end of the plunger stroke. The fluid connection 152 is the same as the connection 70 in many respects with the corresponding parts being similarly numbered and with the plunger 72 and the piston 76 shown at the right extremities of their strokes, in this instance. FIG. 8 shows the control collar 126 in elevation and also shows the particular position of the exhaust ports 120 when communicating with the exhaust chamber 122.

Four supply grooves 154, 156, 158, and 160 are located in the plunger cylinder 80 in the general position previously occupied by the spacer ring 110. The supply grooves 154–160 also have radially extending ports 162 which communicate with a supply chamber 164 to which fluid is supplied through a threaded opening 166 by a supply pipe (not shown). A supply control collar 168 is located in the chamber 164 and can be moved by a control push-pull rod 170 to cover the ports 162 in one or more of the supply grooves 154–160. However, the collar 168 has stop pins 172 which prevent it from covering the ports in the last supply groove 160 so that some hydraulic fluid will always be supplied to the cylinders 80 and 82 for the purpose of cooling the piston rod 78 and for gradually purging the cylinders. While the length of stroke of the plunger 72 remains unchanged, being determined by the prime mover, the effectiveness of the beginning of its stroke is controlled according to the collar 168. As the collar 168 is moved toward the left to expose more of the supply groove ports, the effectiveness of the plunger 72 is decreased because it cannot build up pressure in the cylinder 80 to cause movement of the piston 76 until it covers the last of the grooves 154–160, the ports of which communicate with the supply chamber 164. When this occurs, the piston is then forced to move until the plunger 72 reaches the end of its stroke or until the associated exhaust groove ports of one of the exhaust grooves is uncovered by the piston 76 with that particular set of ports also being uncovered by the control collar 126.

If desired, a back passage 174 with a valve 176 can be positioned to provide communication between the supply chamber 164 and the left end of the plunger cylinder 80, to render ineffectual the entire stroke of the plunger 72. In this manner, the compressor or other driven component can be stopped while the prime mover continues to operate at its usual rate. This is particularly effective for short stops when it is undesirable to stop the prime mover.

The invention is particularly useful in the compression of gases employed in the production of polyethylene plastic materials. In the production of such plastic, ethylene or ethane gas is compressed to very high pressures and exposed to a catalyst. When the catalyst employed is new, large volumes of the compressed gas can be employed, with the volume or flow of the gas decreased as the catalyst is used and its effectiveness decreases. Finally, the catalyst must be reactivated and the cycle commenced again. The constant change in capacity of the compressor heretofore has been accomplished by changing the speed of rotation of the driver. A drive of this type, however, is relatively expensive and operational problems sometimes result. For example, the speed of the driver may produce resonance with the natural frequencies of the complicated piping systems and result in leaking or rupturing thereof.

By connecting the fluid transmission according to the invention between the driver and the compressor, several advantages result and several disadvantages are overcome. The fluid transmission enables the capacity of the system to be varied by changing the length of the compressor stroke while maintaining constant speed. A less expensive, constant speed driver then can be employed. Further, by using a constant speed which is engineered to avoid sympathetic vibration, there is no possibility of accidentally matching a natural frequency of the system which can occur with drivers operating under varying speeds.

Apparatus for compressing a gas such as ethylene is indicated by the reference numeral 178 in FIG. 9 and includes a crosshead indicated at 180, only part of which is shown, a fluid transmission or connection embodying the invention indicated at 182, and a high pressure compressor indicated at 184. The specific design of the compressor 184 does not constitute part of the invention. The compressor can be similar to that of FIG. 3 and basically includes a cylinder 186, a compressor piston 188, and an inlet 190 and an outlet 192 in a compressor head 194.

The fluid connection 182 is basically similar to the fluid connections 30 and 70 but includes length control means only at the driver end rather than at the driven end as for the fluid connection 70 of FIG. 4, or at both ends as for the fluid transmission connection 152 of FIG. 7. In addition, the fluid connection 182 includes mechanism for changing the length control means in order to remotely change and control the length of the stroke of the compressor piston 188.

The fluid transmission connection 182 includes a drive plunger 196 which is connected to the crosshead 180 by means of an aligning link 198 which enables the crosshead 180 and the plunger 196 to operate out of alignment without binding. The aligning link 198 eliminates the need for the special sealing rings 100 of FIGS. 4, 5, and 7 which are required to maintain a seal if the plunger 72 and the crosshead 74 are connected directly together and are slightly misaligned. A driven piston 200 is affixed to a compressor piston rod 202 of the compressor piston 188 by means of a ball joint connection 204 which again accommodates some misalignment between the piston rod 202 and the piston 200. The plunger 196 reciprocates in a plunger cylinder 206 while the driven piston 200 reciprocates in a piston cylinder 208 which, as shown, is larger in diameter than the plunger cylinder 206.

With the driven piston being larger than the drive plunger, and their respective cylinders assuming a similar ratio, part of the load on the driven piston is transmitted back through the fluid transmission housing to the frame and thus relieves the crankshaft bearings of some of the load it otherwise must carry. This shift in loading enables the size and strength of the engine to be decreased and contributes significantly to lowering the cost thereof.

In addition, it has been found that a much larger load than normal can be used on the crankshaft bearings because the bearing is unloaded when the plunger 196 is in its rear position. This enables a new oil film to be established between the bearing surfaces which is not possible when a direct drive is employed and the load is always on the bearing. For example, in one instance, a load of 100,000 pounds could be used on a bearing which otherwise, with a direct drive, was designed for only 60,000 pounds. Hence, this factor also contributes significantly to the reduction in engine size and structure.

The length of the stroke of the driven piston 200 is controlled entirely by means associated with the drive plunger 196. In this instance, a multiplicity of radially-extending passages 210 are formed through a cylinder wall 212 and communicate with an annular manifold chamber 214 to which oil is fed through an inlet 216 containing an orifice 218. This oil can be supplied from the compressor of the engine or prime mover and is regulated at constant pressure, at 30 p.s.i., for example. Oil is exhausted from the chamber 214 back to the crankcase of the engine through an unrestricted outlet 220 to which is connected a pressure relief valve 222. The manifold chamber 214 communicates directly with the plunger cylinder 206 through rear make-up passages 224 which supply additional oil to the cylinder 206 when the plunger 196 is in its rear position. The driven piston 200 is deliberately made slightly smaller than it ordinarily would be so that some hydraulic fluid in the cylinders 206 and 208 will escape past the piston 200 and eventually flow into a chamber 224 to drain 226 communicating therewith. The piston 200 and the cylinder 208 preferably are sized so that approximately a teaspoon of make-up fluid is supplied through the supply passages 224 to the cylinder 206 upon each stroke of the drive plunger 196. This expedient keeps the oil in the cylinders 206 and 208 cooler and tends to purge the cylinders of any foam in the fluid. In addition, of course, the looser fits enables larger tolerances to be employed.

At least some of the length control passages 210 communicate with the annular manifold chamber 214 except when a length control sleeve 227 is in its extreme right hand position with stop pins 228 abutting the end of the manifold chamber 214. In this position, all of the passages 210 are blocked and the plunger 196 and the driven piston 200 function as if the passages 210 were non-existent. In this full capacity situation, the driven piston 200 moves its full or maximum stroke in relation to the stroke of the drive plunger 196. As before, the length of the drive piston stroke is related to the length of the drive piston stroke according to the inverse ratio of the square of the diameters of the cylinders 206 and 208.

When the length control sleeve 227 is in a position to the left of the extreme position shown, some of the right hand passages 210 communicate with the chamber 214 and when these passages connect the chamber 214 and the cylinder 210 during a suction stroke of the plunger 196, oil under pressure in the chamber 214 flows into the cylinder 206 as the plunger continues its exhaust stroke. Once some of the uncovered radial passages 210 are exposed by the plunger 196, the rest of the suction stroke of the plunger is rendered ineffective since the driven piston 200 will stop once these passages are opened. Similarly, after the plunger 196 has reached the end of its exhaust or suction stroke and begins another power stroke, the oil in the cylinder 206 is forced outwardly to the chamber 214 until the passages 210 are blocked by the plunger 196. Until this occurs, the pressure in the cylinder 206 as well as in the cylinder 208 cannot exceed the pressure in the chamber 214 so that the piston 200 remains substantially stationary from the time the open passages 206 are uncovered during an exhaust stroke until the time that they again are blocked during a power stroke.

To avoid abrupt stopping and starting of the piston 200, the sleeve 227 has an annular tapered portion 230 which covers and uncovers the outer ends of the radial passages 210 gradually and thereby relatively slowly starts and stops the piston 200. This is important to smooth operation of the fluid connection 182 and to reduction in wear and stress on the components thereof.

The sleeve 227 also contains a safety device 232 which is shown in more detail in FIG. 11. The safety device 232 includes an emergency vent 234 extending radially through the sleeve 227, which vent is blocked by a rupture diaphragm or disc 236 suitably held transversely of the vent. Because the pressure in the cylinder 206 varies as the plunger 196 reciprocates, this pressure variation ordinarily would tend to pulsate the ruture disc 236 and cause failure thereof. To overcome this, a valve plate 238 is located across the passage 234 and is held in a blocking position by a suitable spring 240. The plate 238 maintains a constant pressure in the passage 234 to prevent metal fatigue of the disc 236 but yields readily when a given pressure is exceeded to enable that pressure to be transmitted to the disc 236. In this instance, eight of the safety devices 232 are located around the sleeve 227. The safety devices 232 are very important to prevent extensive damage which otherwise occurs in high pressure compressors of this type when liquid is occasionally trapped in the compressor cylinder 186, thereby causing extensive damage during a compression stroke of the compressor piston 188.

The sleeve 227 is designed to have a sliding fit with the cylinder wall 212 and to move along the radial passages 210 in increments by a slight turn of a control handle. Toward this purpose, an annular cylinder 242 is established around the cylinder wall 212 by a lower wall 244 and a thick upper wall 246. The sleeve 227 has a sliding fit with the outer walls 244 and 246 of the annular cylinder 242, as well as with the cylinder wall 212, so that the sleeve acts as a piston in the annular cylinder 242. Oil under higher pressure than that in the chamber 214 is supplied to the annular cylinder 242 from a supply passage 248 with an orifice 250 therein. This oil is supplied at a pressure of sixty p.s.i. as compared with thirty p.s.i. in the chamber 214, for example, by an auxiliary pump of one to two horsepower for the average application.

The higher oil pressure in the chamber 242 thus moves the sleeve 227 toward the end wall of the chamber 214, to the position shown, unless the annular cylinder 242 is vented first to decrease the pressure therein. Venting of the cylinder 242 is accomplished by opening any of a plurality of vent passages 252 in the upper, thick wall 246. The vent passages 252, when aligned with openings or slots 254 (FIG. 10) in a rotatable tube 256 located at the upper ends of the passages, communicate with a return line 258 which directs the oil back to the crankcase downstream of the pressure relief valve 222. The openings 254 in the tube 256 are of different lengths and are positioned such that, for a given amount of rotation of the tube 256, one more or less opening will be aligned with its associated vent passage 252. In this instance, each of the openings differs in its arcuate extent by 15° from each adjacent one so that each 15° rotation of the tube 256 changes the number of openings in communication with the vent passages. There are a total of nine of the openings 254 in the tube 256 which provide a ten-step control, counting the position of the tube in which none of the vent passages 252 communicate with the vent line 258.

While the vent passages 252 and the openings 254 are shown as being equally spaced, they are actually closer together at the right end and farther apart at the left end in order to provide equal volume changes of the output of the compressor 184.

When in the latter position, the full oil pressure is applied to the chamber 242 and the sleeve 227 is in the fully extended position with the stop 228 abutting the end wall of the chamber 214. In this position, the sleeve 227 blocks all of the radial passages 210, leaving only the make-up oil supply passages 224 in communication with the chamber 214. This is the full capacity position of the sleeve and enables the entire length of the stroke of the plunger 196 to be effective and thereby move the driven piston 200, along with the piston rod 202 and the compressor piston 188, their full length.

When the tube 256 is turned by a control handles 260 through an arc of 15°, the first of the openings 254 is placed in communication with the first of the vent passages 252, thereby dropping the pressure in the cylinder 242 since the oil therein will flow outwardly faster than it can be supplied through the orifice 250. The oil pressure then drops below the thirty pound pressure in the chamber 214 and the latter pressure pushes the sleeve 227 toward the left to uncover some of the passages 210 until the sleeve 227 blocks the first of the vent passages 252. With the first vent passage blocked, the pressure again builds up in the annular cylinder 242 to stop further movement of the sleeve 227. The sleeve thereby stabilizes itself at a position approximately in line with the first of the vent passages 252. In that position, several annular rows of the passages 210 at the right end of the cylinder 206 will be in communication with the chamber 214 with at least some of the rows of passages 210 partially restricted by virtue of the tapered portion 230 of the sleeve. When the drive plunger 196 is near the rear of its stroke and uncovers these rows of the passages 210, the plunger cylinder 206 and the chamber 214 will be in communication with one another and the latter portion of the plunger stroke will be ineffective. As the plunger is retracted, fluid in the chamber 214 will be pulled into the cylinder 206 and the piston 200 will no longer travel toward the rear, thereby shortening its stroke. Similarly, after the plunger 196 reaches its extreme rear position and begins forward movement, it forces fluid in the cylinder 206 back into the chamber 214 and does not begin to drive the piston 200 until the first passages 210 are blocked by the plunger. For example, with ten percent of the passages 210 communicating with the chamber 214, the plunger 196 will continue its full stroke but the length of the stroke of the piston 200 and, hence, the compressor piston 188 will be decreased by approximately ten percent. The tapered portion 230 of the sleeve 227 enables the pressure in the cylinder 206 to build up and drop relatively gradually to provide smoother operation of the piston 200.

If the control lever 260 is now rotated so that the second opening 254 is in communication with the second vent passage 252, the sleeve 227 will move to a position in which it is approximately aligned with the second vent passage 252, regardless of whether or not the first opening is in communication with the first vent passage. An additional number of the radial passages 210 will then be uncovered in the chamber 214 and the stroke of the driven piston 200 will be reduced by another increment. When the ninth opening 254 is in communication with the ninth vent passage 252, all of the radial passages 206 will be uncovered in the chamber 214 and the plunger cylinder 206 will be in communication with the chamber 214 throughout the entire stroke of the plunger 196. In this instance, the entire stroke of the plunger 196 will be ineffective and the driven piston 200 will remain substantially stationary. Very little power then is required to operate the plunger 196, only enough to push the oil back and forth through the passage 210 between the cylinder 206 and the outer chamber 214.

Referring now in more detail to the driven portion of the fluid transmission 182, the driven piston 200 includes a projecting annulus 262 which cooperates with an annular recess 264 in a partitioning ring 266 which separates the cylinders 206 and 208. The annulus 262 and the recess 264 serve as a dashpot to cushion the stroke of the driven piston 200 if it exceeds its intended retracted position away from the compressor 184 and thereby serves as a safety feature. At the opposite end of the piston 200 is a second annulus 268 which cooperates with a second annular recess 270 in an end ring 272 which also cushions the stroke of the piston 200 if it exceeds its intended forward position toward the compressor 184.

The piston 200 has an additional safety feature in a plurality of longitudinally extending exhaust passages 274 cooperating with shorter radial passages 276, with the latter cooperating with an annular exhaust manifold 278 communicating with a drain passage 280 which is connected back to the engine crankcase. The radial exhaust passages 276 are aligned with the manifold 278 if the piston moves slightly beyond the intended maximum stroke, toward the compressor 184, and thereby exhaust oil from the cylinder 208 to the drain passage 280, to prevent further movement of the driven piston 200.

The overall operation of the fluid transmission 182 in connection with the compression of ethane gas will be evident from the above discussion but will be reviewed briefly. When the catalyst is new, the control handle 260 is positioned to block off all of the vent passages 252 so that the sleeve 227 is in its extreme right hand position and all of the passages 210 are blocked. The compressor 184 then operates at full capacity with the entire stroke of the plunger 196 being effective to move the driven piston 200 its maximum distance. As the catalyst is used and decreases in effectiveness, the output from the compressor 184 must be decreased; this is accomplished by moving the control handle 260 to align the first vent opening 254 with the first vent passage 252. This vents the annular chamber 242 and causes the oil pressure in the chamber 214 to push the sleeve 227 toward the left until the left end of it becomes aligned with the first vent passage 254. A rear portion of the stroke of the plunger 196 is then rendered ineffective and the stroke of the piston 200 as well as the compressor piston 188 are correspondingly shortened. During partial operation of the plunger 196 the pressure in the chamber 214 will vary slightly as oil is pumped into it and out of it from and to the plunger cylinder 206. A slight movement of the sleeve 227 results but this is not seriously detrimental to the operation and does not wear the sleeve to any degree because it is encased in oil. As the effectiveness of the catalyst further decreases, the vent passages 52 toward the left are opened to cause the sleeve 227 to move further toward the left and to render more of the stroke of the drive plunger 196 ineffective, thereby decreasing the stroke of the compressor piston 188 and decreasing the output of the compressor 184.

Should it be desirable to shut down one of the compressors 184, this can be accomplished by venting the last of the vent passages 252 so that the piston 200 will not move at all. The rest of the compressors can then continue to be operated by the prime mover without shutting down the entire group of four or eight compressors, whichever are employed on the frame.

The fact that each compressor piston can be individually stopped and started also renders start-up of the overall unit easier since the compressors can be put into operation one at a time.

If liquid should be trapped in the compressor cylinder 186 during operation, the sudden rise in oil pressure in the cylinder 206 will rupture the disc 236. If the driven piston 200 exceeds the normal extremity of its stroke in either direction, it will be cushioned by oil being trapped between the annulus 262 and the recess 264 or between the annulus 268 and the recess 270. Also, if the driven piston 200 exceeds the extremity of its stroke toward the compressor 184 by a predetermined amount, the passages 274 and 276 will be aligned with the manifold 278 to exhaust oil from the chamber 208 and thereby stop the motion of the piston 200.

The flow of fluid from the drive cylinder 206 to the driven cylinder 208 is relatively low, in the order of 1½ to 2 feet per minute so that friction losses are correspondingly low.

Various modifications of the above described embodiments of the invention will be apparent to those skilled in the art and it is to be understood that such modifications can be made without departing from the scope of the invention, if they are within the spirit and the tenor of the accompanying claims.

What I claim is:

1. A hydraulic power transmission for connecting a lineally reciprocating driving member to a reciprocable driven member, said transmission comprising:
    a hollow casing,
    a lineally reciprocable power input plunger in said casing,
    a lineally reciprocable power output piston in said casing and hydraulically opposed to said power input plunger, said output piston having a projecting annulus extending toward said input plunger,
    means directly connecting said power input plunger to said driving member and reciprocable therewith through a driving stroke of fixed length,
    means directly connecting said power output piston to said reciprocable driven member,
    said input plunger and said output piston each having a pressure face spaced from the other and of different areas to produce a different stroke length, velocity, and power output of said output piston relative to the stroke length, velocity, and power input of said input plunger,
    and means forming an annular recess in said casing near the end of the stroke of said output piston toward said input plunger, said recess cooperating with said annulus to function as a dashpot to cushion the stroke of said output piston if it exceeds its intended position toward said input plunger.

2. A hydraulic transmission for connecting a lineally reciprocating driving member to a reciprocable driven member, said transmission comprising:
    a hollow casing,
    a lineally reciprocable power input plunger in said casing,
    a lineally reciprocable power output piston in said casing and hydraulically opposed to said power input plunger,
    means directly connecting said power input plunger to said driving member and reciprocable therewith through a driving stroke of fixed length,
    means directly connecting said power output piston to said reciprocable driven member,
    means establishing a separate chamber near said casing and said output piston, said casing having a cooling port communicating with said separate chamber,
    and said output piston having cooling passage means therethrough communicating with the interior of said casing adjacent said piston and communicating with said cooling port when near an end of its stroke away from said input plunger to enable fluid in said casing to be transmitted through said cooling passage to said cooling port when said cooling passage is aligned therewith.

3. A hydraulic power transmission for connecting a lineally reciprocating driving member to a reciprocable driven member and for changing the stroke of the driven member relative to the stroke of the driving member, said transmission comprising:
    a hollow casing,
    a lineally reciprocable power input plunger in said casing,
    a lineally reciprocable power output piston in said casing and hydraulically opposed to said power input plunger,
    means directly connecting said power input plunger to said driving member and reciprocable therewith through a driving stroke of fixed length,
    means directly connecting said power output piston to said reciprocable driven member, means including supply port means in said casing near the end of the stroke of said input plunger away from said output piston for supplying hydraulic fluid to said casing when said plunger is near said end of its stroke, and means including exhaust port means in said casing near the end of the stroke of said output piston away from said input plunger for exhausting fluid from said casing when said piston is near said end of its stroke whereby the hydraulic fluid in said casing is continually removed and replenished during operation of said transmission.

4. A hydraulic power transmission for connecting a lineally reciprocating driving member to a reciprocable driven member and for changing the stroke of the driven member relative to the stroke of the driving member, said transmission comprising:

a hollow casing, a lineally reciprocable power input plunger in said casing, a lineally reciprocable power output piston in said casing and hydraulically opposed to said power input plunger, means directly connecting said power input plunger to said driving member and reciprocable therewith through a driving stroke of fixed length, means directly connecting said power output piston to said reciprocable driven member, means spaced longitudinally of said casing over at least a portion of the stroke of said input plunger for selectively supplying hydraulic fluid to said casing from different points spaced longitudinally of said casing, and means spaced longitudinally of said casing over at least a portion of the stroke of said output piston for selectively exhausting hydraulic fluid from different points spaced longitudinally of said casing, whereby the length of the stroke of said piston can be varied without changing the length of the stroke of said plunger.

5. A hydraulic transmission for connecting a lineally reciprocating driving member to a reciprocable driven member of a compressor and for changing the stroke of the driven member relative to the stroke of the driving member, said transmission comprising:

a hollow casing, a lineally reciprocable power input plunger in said casing connected directly to said reciprocating driving member, a reciprocable power output piston in said casing connected directly to said reciprocable driven member and hydraulically opposed to said power input plunger, a seal through which said driven member extends outside an end of said casing, said seal including means forming a chamber through which said drive member extends, a labyrinth seal at one end of said chamber, a boot around said driven member at the other end of said chamber, means for supplying fluid under pressure to said boot, means for removing fluid in said chamber coming from said boot, and means transferring any gas in said chamber from the compressor system back to said compressor.

6. A hydraulic power transmission for connecting a lineally reciprocating drive member to a reciprocable driven member and for changing the stroke of the driven member relative to the stroke of the drive member, said transmission comprising:

first wall means forming a plunger cylinder, a lineally reciprocable power input plunger in said cylinder, second wall means forming a piston cylinder having a diameter different than the diameter of said plunger cylinder, a lineally reciprocable power output piston in said piston cylinder and hydraulically opposed to said power input plunger, means directly connecting said power input plunger to said drive member and reciprocable therewith through a driving stroke of fixed length, means directly connecting said power output piston to said reciprocable driven member, means forming an exhaust manifold around said plunger cylinder, a plurality of ports extending through said plunger cylinder wall means and disposed in each of several longitudinally spaced circles along said plunger cylinder wall means, a sleeve around said plunger cylinder wall means and movable therealong, and means for moving said sleeve along said wall means to selectively cover and uncover said ports.

7. A hydraulic power transmission for connecting a lineally reciprocating drive member to a reciprocable driven member and for changing the stroke of the driven member relative to the stroke of the drive member, said transmission comprising:

first wall means forming a plunger cylinder, a lineally reciprocable power input plunger in said cylinder, second wall means forming a piston cylinder, a lineally reciprocable power output piston in said piston cylinder and hydraulically opposed to said power input plunger, means directly connecting said power input plunger to said drive member and reciprocable therewith through a driving stroke of fixed length, means directly connecting said power output piston to said reciprocable driven member, means forming an exhaust manifold around said plunger cylinder, a port extending through said plunger cylinder wall means and communicating with said exhaust manifold, a sleeve around said plunger cylinder wall means and movable therealong, means forming a chamber at one end of said sleeve, means for supplying fluid to said chamber at a pressure higher than the pressure in said exhaust manifold, and means for exhausting fluid from said chamber at a plurality of positions therealong.

8. A hydraulic power transmission for connecting a lineally reciprocating drive member to a reciprocable driven member, said transmission comprising:

first wall means forming a plunger cylinder, a lineally reciprocable power input plunger in said cylinder, second wall means forming a piston cylinder, a lineally reciprocable power output piston in said piston cylinder and hydraulically opposed to said power input plunger, means directly connecting said power input plunger to said drive member and reciprocable therewith through a driving stroke of fixed length, means directly connecting said power output piston to said reciprocable driven member, a port extending through said plunger cylinder wall means, a frangible safety seal in said port, and a spring-loaded disc in said port on the side of said seal toward said plunger cylinder to prevent pulsations of fluid in said exhaust chamber from reaching said seal.

(References on following page)

References Cited by the Examiner

UNITED STATES PATENTS

| | | | |
|---|---|---|---|
| 662,515 | 11/1900 | Yale | 60—54.5 X |
| 1,802,790 | 4/1931 | Squires | 60—54.5 X |
| 1,959,822 | 5/1934 | Greve | 137—68 X |
| 2,135,011 | 11/1938 | McGouchie | 60—54.5 |
| 2,343,962 | 3/1944 | Dodson | 103—44 |
| 2,388,925 | 11/1945 | Messinger | 277—206 X |
| 2,446,862 | 8/1948 | Wilders et al. | 60—54.5 |
| 2,452,526 | 10/1948 | Osborne | 230—49 |
| 2,602,434 | 7/1952 | Barnaby | 60—54.5 X |
| 2,807,215 | 9/1957 | Hawhurst | 103—38 |
| 2,895,492 | 7/1959 | Bell | 137—68 |
| 2,959,132 | 11/1960 | Chappelle | 60—54.5 X |
| 3,149,469 | 9/1964 | Williams | 103—44 X |

MARTIN P. SCHWADRON, *Primary Examiner.*

ROBERT R. BUNEVICH, *Examiner.*